(12) United States Patent
Rosinski

(10) Patent No.: US 7,999,243 B2
(45) Date of Patent: Aug. 16, 2011

(54) APPARATUS AND METHOD FOR DETERMINING A DIMENSIONAL CHARACTERISTIC OF AN INSTALLED WELD FASTENER

(75) Inventor: Robert J. Rosinski, Mt. Clemens, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 409 days.

(21) Appl. No.: 12/234,865

(22) Filed: Sep. 22, 2008

(65) Prior Publication Data

US 2010/0073691 A1    Mar. 25, 2010

(51) Int. Cl.
*G01N 21/86* (2006.01)
(52) U.S. Cl. .................. 250/559.19; 250/559.3
(58) Field of Classification Search .................. 250/239, 250/559.3, 559.19, 559.1; 356/635; 33/520, 33/836, 542, 828; 29/402.01
See application file for complete search history.

(56) References Cited

U.S. PATENT DOCUMENTS 2,801,472 A * 8/1957 Davidiak et al. ................ 33/811
6,427,356 B1 * 8/2002 Schamal ......................... 33/613

* cited by examiner

*Primary Examiner* — Que T Le
(74) *Attorney, Agent, or Firm* — Quinn Law Group, PLLC

(57) ABSTRACT

A tool determines a characteristic of an installed weld fastener using a dimensional measurement device, and includes a threaded portion engageable with the weld fastener and a cylindrical portion. A controller is in communication with the measurement device, and calculates the characteristic using raw dimensional data provided by the measurement device. The measurement device determines an approximate centerline of the cylindrical portion to thereby determine the raw dimensional data. A method determines the approximate centerline using the measurement device by connecting a threaded surface of a tool to the installed weld fastener, measuring dimensions of the cylindrical portion via the measurement device to determine the set of raw dimensional data, and determining the characteristic using the raw dimensional data. A control action can be executed when the characteristic is outside of a calibrated range.

15 Claims, 2 Drawing Sheets

APPARATUS AND METHOD FOR DETERMINING A DIMENSIONAL CHARACTERISTIC OF AN INSTALLED WELD FASTENER

TECHNICAL FIELD

The present invention relates generally to an apparatus and a method for determining an installed centerline, offset angle, dimension, or other characteristic of an installed weld fastener.

BACKGROUND OF THE INVENTION

Weld fasteners such as weld nuts, studs, posts, screws, or other weld fasteners are pieces of externally-threaded or internally-threaded fastening hardware that are welded around a perimeter of an opening in a panel or other work piece, thus securing the weld fastener to the work piece. Once the weld fastener has been secured in this manner, another work piece can be joined to the first work piece using a mating nut or bolt, depending on the configuration of the weld fastener. For example, in an automotive vehicle panel having an installed weld stud, the panel can be placed immediately adjacent to an opening or hole in another vehicle panel such that the weld stud protrudes through the hole. A standard nut can then be threaded onto the free end of the weld stud and sufficiently tightened to thereby securely join the adjacent panels. In the same manner, a weld nut can be welded into a hole formed in a vehicle panel, with a threaded fastener inserted into the weld nut through a hole in another vehicle panel to thereby join the adjacent panels.

Due to the additional strength provided by the weld, weld fasteners are relatively strong and durable compared to conventional non-welded fasteners. However, the welded nature of a weld fastener also provides a number of challenges. For example, it can be difficult to weld a weld fastener to the work piece precisely enough to provide the installed fastener with a desired centerline or offset angle relative to the plane of the work piece. Therefore, the actual centerline of the installed weld fastener can be offset from the desired or specified angle. Moreover, certain characteristics of an installed weld fastener can be difficult to measure accurately using contact-type or noncontact type dimensional measurement sensors or devices due largely to the limited surface area and inherent variation of the individual threads of the weld fastener.

SUMMARY OF THE INVENTION

Accordingly, an apparatus and a method are provided for determining a characteristic of an installed weld fastener using a dimensional measurement device of the type described below. The apparatus itself includes a tool having one or more threaded portions and one or more cylindrical portions, the dimensional measurement tool, and an integrated control unit or controller having an algorithm for executing the method of the invention. The algorithm translates a set of raw dimensional data transmitted from the measurement device into the characteristic of the installed weld fastener.

More particularly, the threaded portion or portions of the tool engage with threads of an installed weld fastener. The weld fastener can be alternately configured as a weld nut, i.e., an internally-threaded weld fastener, or as a weld stud, i.e., an externally-threaded weld fastener. Each cylindrical portion of the tool is integrally and coaxially formed with a respective threaded portion, with the cylindrical portion defining a cylindrical outer surface. The controller is in communication with the measurement device, and calculates the characteristic of the weld fastener using the set of raw dimensional data provided by the measurement device. The term "raw dimensional data" as used hereinafter refers at least to data describing measured diameters of the cylindrical outer surface, and may include additional raw data or calibrated data describing other dimensions of the cylindrical portion as needed, such as its length, wall thickness, etc.

When the weld fastener is configured as a weld nut, the threaded portion is an internally-threaded center channel formed within the cylindrical portion along the longitudinal axis of the cylindrical portion. Likewise, when the weld fastener is configured as a weld stud, the threaded portion is an externally-threaded shaft formed integrally with the cylindrical portion, with the longitudinal axis of the externally-threaded shaft being coaxially aligned with the longitudinal axis of the cylindrical portion. The characteristic of the installed weld fastener can include, but is not limited to, the actual installed centerline of the installed weld fastener, its position with respect to a predetermined point on an interface with the work piece, and/or its installed offset angle or angularity. According to one embodiment, the tool has a first and a second tool portion, each configured for use with a respective weld nut and a weld stud. In this embodiment, the first and second tool portions can be mated, connected, or otherwise engaged to facilitate storage of the tool when not in use, while also minimizing the likelihood of damage to exposed threads of the tool.

The method of the invention includes connecting the threaded portion of the tool to the installed weld fastener. Dimensions of the cylindrical portion are measured using the dimensional measurement device to provide the set of raw dimensional data. The characteristic of the installed weld fastener is calculated using the set of raw dimensional data, and a control action can be executed whenever the value of the characteristic falls outside of a calibrated range.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
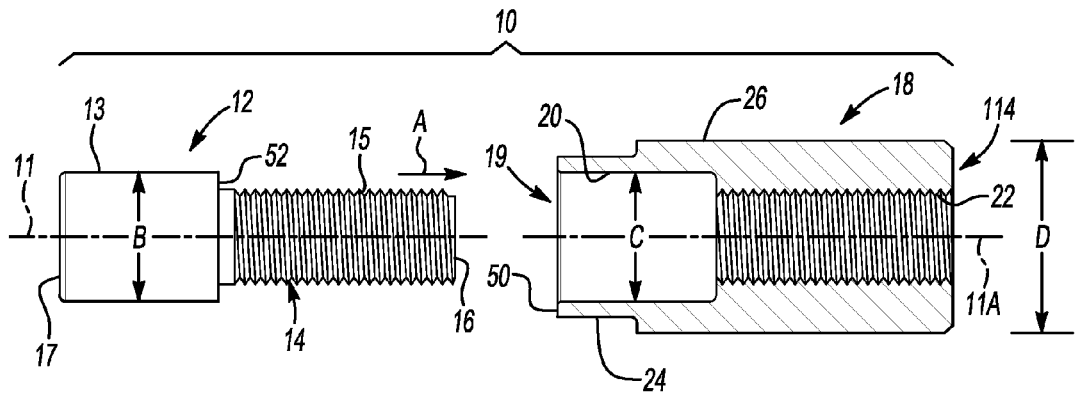
FIG. 1 is a schematic illustration of a tool for determining a characteristic of an installed weld fastener in accordance with the invention.

Referring to the drawings wherein like reference numbers correspond to like or similar components throughout the several figures, and beginning with FIG. 1, a weld fastener dimensional measurement tool 10, hereinafter referred to simply as the tool 10, which includes a first tool portion or weld nut tool 12 and a second tool portion or a weld stud tool 18. The weld nut tool 12 includes a first threaded portion 14 that is engageable with an installed weld fastener as described below with reference to FIGS. 2 and 3. The first threaded portion 14 is integrally formed with a cylindrical portion 13 to form a first tool portion or a weld nut tool 12.

The weld stud tool 18 includes a second threaded portion 22 integrally formed within another cylindrical portion 26 to form a second tool portion or a weld stud tool 18. The weld nut tool 12 can be threaded into the weld stud tool 18 to facilitate storage of the tool 10, thus protecting each of the tools 12, 18 from thread damage. When the tools 12, 18 are separated from each other, the weld nut tool 12 is configured to mate with an internally-threaded weld nut while the weld stud tool 18 is configured to mate with an externally-threaded weld stud, as indicated by arrow A, with each of these terms described below with reference to FIGS. 2 and 3.

The weld nut tool 12 can be constructed of any desired plastic, metal, or composite material, and includes the cylindrical portion 13 having a solid end 17. The cylindrical portion 13 has a smooth outer surface with a uniform outer diameter B. The cylindrical portion 13 is formed integrally with the first threaded portion or a threaded shaft 14 having a solid end 16 and external threads 15, such as but not limited to: national pipe tapered thread (NPT), British Standard Pipe tapered or parallel threads (BSPT or BSPP, respectively), metric threads such as M6, M8, M10, M12, etc., or other desired thread types. Although not shown in FIG. 1 for clarity, the cylindrical portion 13 preferably includes a hexagonal or flat surface at the solid end 17 to improve ease of separation of the tools 12, 18 from each other prior to use.

The weld stud tool 18 likewise can be constructed of any desired material depending on the particular application. When the materials used to construct the tool 10 are both metal, the weld stud tool 18 can be constructed of a sufficiently dissimilar metal from that of the weld nut tool 12 in order to minimize galling when the tools 12, 18 are connected together for storage as indicated above.

The weld stud tool 18 includes a recess or cavity 19 of a diameter C, with the cavity 19 defined by a cylindrical inner surface 20. The diameter C is slightly greater than the diameter B of the weld nut tool 12, such that the cylindrical portion 13 of the weld nut tool 12 can fit within the cavity 19 without interference. A threaded portion 114 of the weld stud tool 18 defines a center channel along a centerline 11A with internal threads 22 configured to receive the external threads 15 of the weld nut tool 12. The cylindrical portion 26 of the weld stud tool 18 has a hexagonal or flat surface 24 configured, shaped, and/or sized for receiving a wrench (not shown) or other device to aid the installation and removal of the weld stud tool 18 from an installed weld stud (see FIG. 2).

Figure 2:
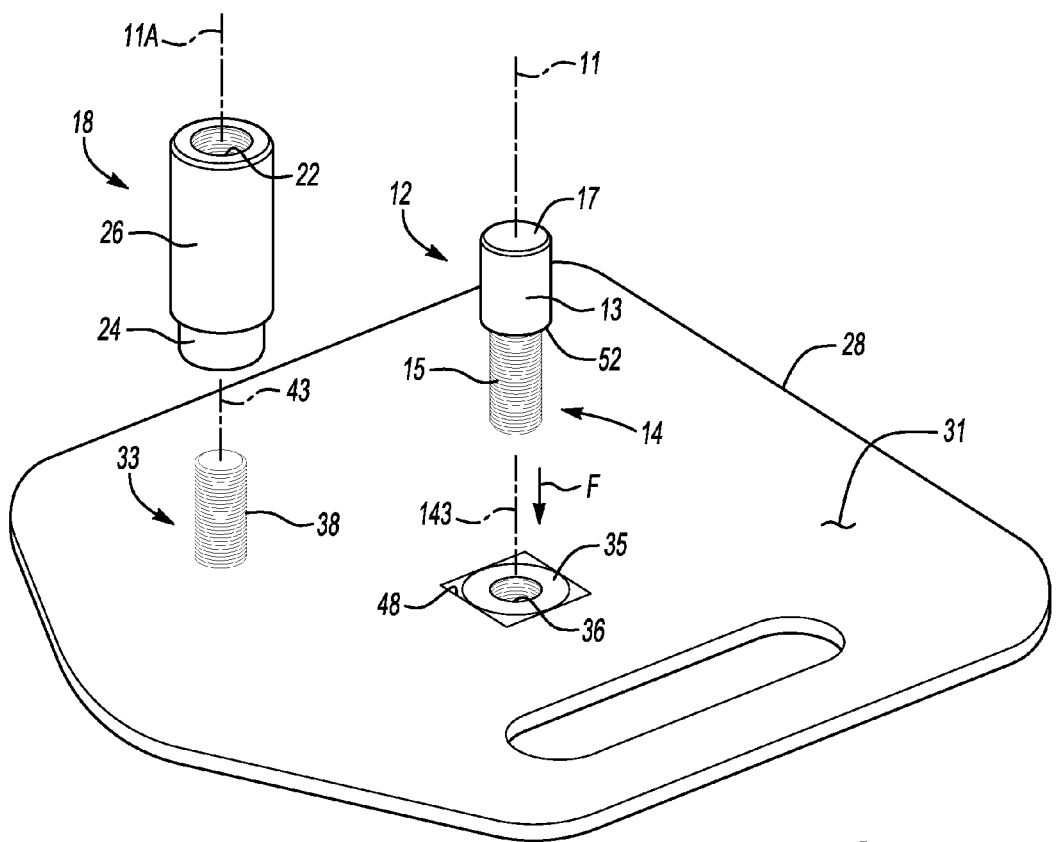
FIG. 2 is a schematic illustration of the tool of FIG. 1 used in conjunction with an exemplary work piece having installed weld fasteners configured as a weld nut and a pair of weld studs.

Referring to FIG. 2, an exemplary work piece 28 includes an installed weld fastener configured as a weld nut 35, with the weld nut 35 being installed or welded to the work piece 28 within an opening 48 formed or provided therein, as described above. The weld nut 35 includes internal threads 36, and can be constructed of any type of weldable material. In an exemplary embodiment, the work piece 28 is configured as a vehicle panel having a work surface 31 to which another panel or work piece (not shown) is to be connected or attached during the assembly process.

The work piece 28 also includes a weld fastener configured as a weld stud 33 having external threads 38, with the weld stud 33 being welded to the work piece 28 as described above. The weld stud 33 has an installed centerline 43, while the weld nut 35 has an installed centerline 143. Because of the presence of the external threads 38 of the weld stud 33 and the internal threads 36 of the weld nut 35, the installed centerlines 43, 143 can be difficult to measure accurately using various contact and non-contact dimensional measuring devices, as will be described below with reference to FIG. 3.

Therefore, the tool 10 of FIG.1 can be separated into the weld nut tool 12 and weld stud tool 18 as discussed above, or if both tools 12 and 18 are not used together, each of the tools 12, 18 can be used separately. The weld stud tool 18 can be threaded onto the weld stud 33 in the direction of arrow F until the underside 50 of the weld stud tool 18 bottoms out on the work surface 31. Likewise, the weld nut tool 12 can be threaded into the weld nut 35 in the direction of arrow F until the underside 52 of the weld nut tool 12 bottoms out on the work surface 31. Once installed in this manner, the weld stud 33 and the weld nut 35 are ready for dimensional checking or measurement, as will now be described with reference to FIG. 3 and FIG. 4.

Figure 3:
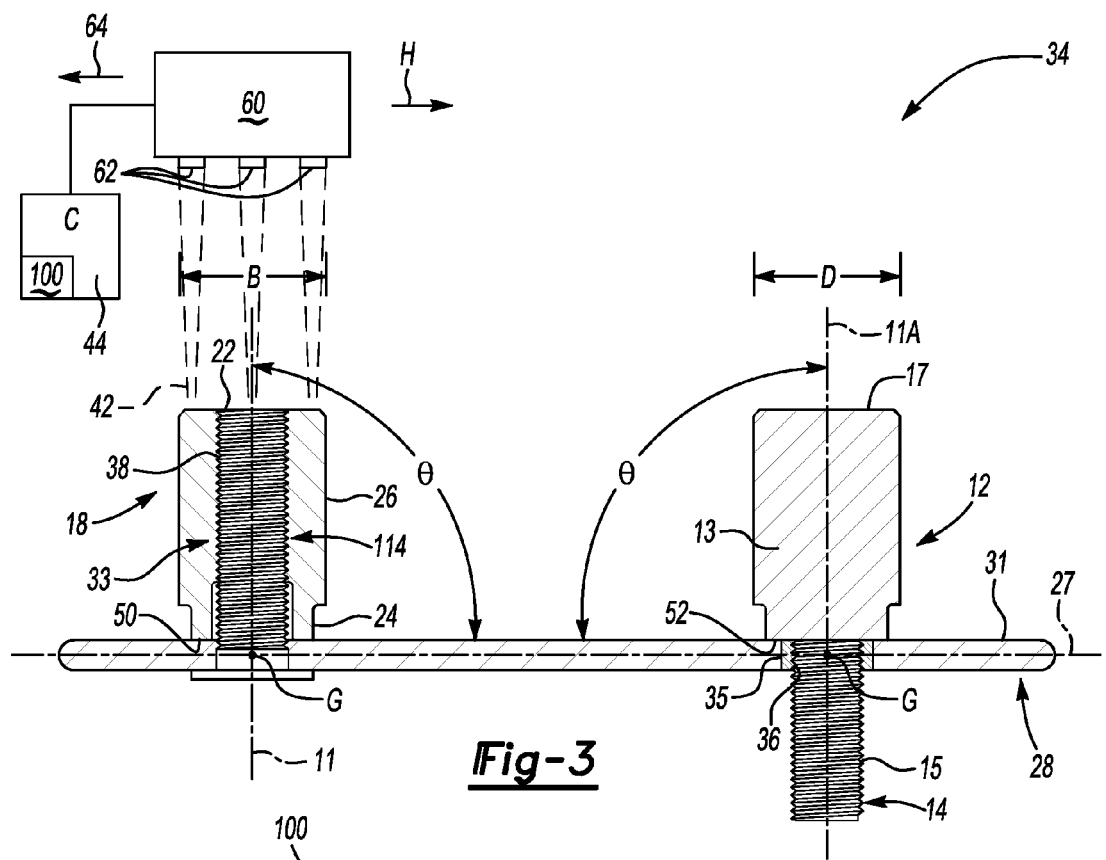
FIG. 3 is a schematic cross-sectional side view of the work piece and tool of FIG. 2 with the tool being fully engaged with the weld fasteners.

Referring to FIG. 3, an apparatus 34 is provided for determining a characteristic of an installed weld fastener, represented in FIG. 3 as the weld stud 33 and the weld nut 35. The apparatus 34 includes the tool 10, a dimensional measurement device 60, and a controller (C) 44 in communication with the device 60. The controller 44 is adapted to calculate a characteristic of the installed weld fastener, i.e., one or both of the weld nut 35 and weld stud 33, whichever is used, using a set of raw dimensional data 64 measured by the device 60 and transmitted, relayed, or otherwise communicated to the controller 44.

The external threads 15 of the first threaded portion 14 (see FIG. 2) of the weld nut tool are engageable with the internal threads 36 of the installed weld nut 35, and the internal threads 22 of the second threaded portion 114 (see FIG. 2) of the weld stud tool 18 are engageable with the external threads 38 of the installed weld stud 33. The device 60, as described below, is operable for measuring the outer diameters B, D of the respective tools 18, 12, to determine the position of the centerlines 11, 11A, to thereby determine the set of raw dimensional data 64.

The work piece 28 is shown in partial cross-sectional side view, with the respective tools 12 and 18 fully installed or connected to a respective weld stud 33 and weld nut 35. The respective centerlines 11, 11A of the tools 12, 18 are coaxially-aligned with the installed centerlines 43, 143 as shown in FIG. 2. The work piece 28 can then be positioned with respect to the device 60. In FIG. 3, the dimensional measurement device 60 is configured as an exemplary non-contact measurement device such as a laser-based coordinate measurement machine (CMM) or digital scanner having a plurality of sensors 62, such as but not limited to digital cameras, photogrammetrical cameras, lasers, or other non-contact sensory devices, with the device 60 being controlled via the controller 44. However, the device 60 can be alternately configured as a conventional probe or contact-type CMM device having calibrated touch probes within the scope of the invention.

One or more sensing beams 42 emitted by the sensors 62 detect or measure a set of raw dimensional data of the cylindrical portions 13, 26 of the tools 12 or 18, respectively, depending on whether a weld nut or a weld stud is being used with the work piece 28. The set of raw dimensional data 64 is then fed from the device 60 to the controller 44 for calculations using an algorithm 100, as described below with reference to FIG. 4.

The algorithm 100 is adapted to calculate or otherwise determine one or more characteristics of the installed weld stud 33 and/or weld nut 35 using the set of raw dimensional data 64. The controller 44 can include a communications control module that enables remote or wireless communications with the device 60 if wireless communication is so desired. The controller 44 executes various programs or algorithms to control the device 60, including the algorithm 100 described in more detail below with reference to FIG. 4. Although not shown in FIG. 3 for simplicity, the controller 44 can be configured as a microprocessor-based device having such common elements as a microprocessor or CPU, memory including but not limited to: read only memory (ROM), random access memory (RAM), electrically-programmable read-only memory (EPROM), etc., and any required electronic circuitry, including but not limited to: a high-speed clock (not shown), analog-to-digital (A/D) circuitry, digital-to-analog (D/A) circuitry, a digital signal processor or DSP, and the necessary input/output (I/O) devices and other signal conditioning and/or buffer circuitry.

Figure 4:
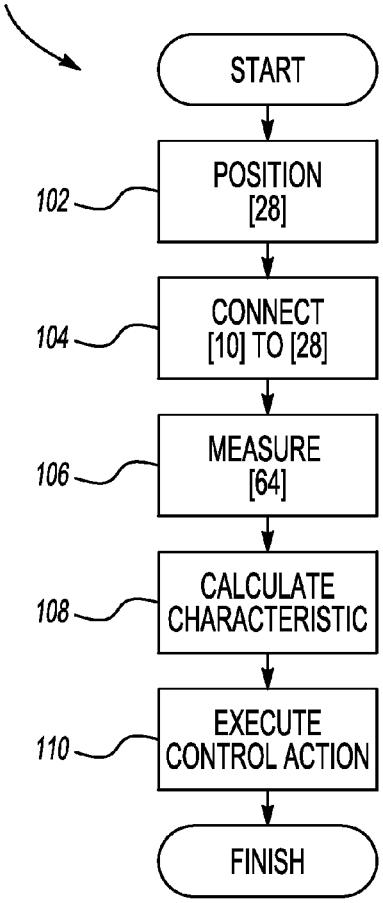
FIG. 4 is a graphical flow chart describing the method of the invention.

Referring to FIG. 4, the algorithm 100 of FIG. 3 is shown in more detail, with the algorithm or method 100 referencing the various components of the tool 10 and the work piece 28 of FIGS. 1-3. Beginning at step 102, the method 100 includes automatically or manually moving or positioning the work piece 28 with respect to the device 60 of FIG. 3 such that subsequent measurements can be taken. The method 100 then proceeds to step 104.

At step 104, the tool 10 is connected to the work piece 28. That is, the weld stud tool 18 is threaded onto the external threads 38 of the weld stud 33, and/or the weld nut tool 12 is threaded into the internal threads 36 of the weld nut 35, depending on which or both tools 12 and/or 18 are needed. Once the tool 10 is connected, the method 100 proceeds to step 106.

At step 106, the set of raw dimensional data 64 is measured or detected by the device 60 and fed to the controller 44. Within the scope of the invention, the raw dimensional data 64 describes the centerpoints in the XYZ frame of reference of at least a pair of diameters (arrows B, D) of the respective cylindrical portions 13, 26 of the tools 12, 18, respectively. A line intersecting these measured centerpoints defines the centerline 11, 11A of the tool 12, 18, respectively. The centerlines 11, 11A can then be used to approximate the true or installed centerlines 43, 143 of the weld nut 35 and weld stud 33, respectively. After the raw dimensional data 64 is recorded by the controller 44, the method 100 proceeds to step 108.

At step 108, the controller 44 uses the centerlines 11, 11A detected or measured at step 106 as an approximation of the installed centerline 43, 143 of the weld stud 33 and weld nut 35, respectively, as noted above. The calculated centerlines can be used to determine one or more characteristics of the installed weld fastener or fasteners, including but not limited to: the position of a point G of the intersection of the centerline 11, 11A and a plane 27 of the work piece 28 (see FIG. 3), angularity or the offset angle (θ) as measured between the centerline 11, 11A and the plane 27 of the work piece 28, etc. The method 100 then proceeds to step 110.

At step 110, an appropriate control action or actions can be taken in response to the preceding steps. For example, historical assembly data can be continuously collected and recorded in a database (not shown) for future reference or training purposes, and/or a message can be generated describing the measurement status and transmitted to a local or remote quality control monitoring device or station (not shown) for immediate corrective action. Alternately, an audio/visual device (not shown) can be selectively illuminated to communicate the results of the measurement, such as illuminating a red light, corrective action can be taken, or another suitable control action can be executed when the centerline 11, 11A and/or the offset angle (θ) falls outside of an allowable or calibrated range.

While the best modes for carrying out the invention have been described in detail, those familiar with the art to which this invention relates will recognize various alternative designs and embodiments for practicing the invention within the scope of the appended claims.

The invention claimed is:

1. An apparatus for determining a dimensional characteristic of an installed weld fastener, the apparatus comprising:
   a dimensional measurement tool having a threaded portion that is engageable with mating threads of the installed weld fastener, and also having a cylindrical portion formed integrally with said threaded portion, wherein said cylindrical portion has an outer diameter and a centerline;
   a dimensional measurement device having a plurality of sensors for measuring a set of raw dimensional data of the tool, including said outer diameter and centerline of said cylindrical portion of the tool; and
   a controller in communication with said dimensional measurement device, said controller being configured to:
      receive the set of raw dimensional data from the dimensional measurement device;
      calculate the dimensional characteristic of the installed weld fastener using the set of raw dimensional data; and
      execute a control action in response to the dimensional characteristic.

2. The apparatus of claim 1, wherein the installed threaded weld fastener is an internally-threaded weld nut that is engageable with said threaded portion.

3. The apparatus of claim 1, wherein the installed weld fastener is an externally-threaded weld stud that is engageable with said threaded portion.

4. The apparatus of claim 3, wherein said threaded portion is an internally-threaded center channel formed integrally with said cylindrical portion.

5. The apparatus of claim 1, wherein the characteristic is one of: a position of a point of intersection of the installed centerline and a plane of the work piece in which the weld fastener is installed, an approximate centerline of the installed weld fastener, and an offset angle of the installed weld fastener as measured between the installed centerline and the plane of the work piece.

6. The apparatus of claim 1, wherein said tool is configured to separate into a first tool portion having a first threaded portion and a first cylindrical portion, said first tool portion being adapted for use with the weld fastener when the weld fastener is configured as a weld nut; and
   a second tool portion having a second threaded portion and a second cylindrical portion adapted for use with the weld fastener when the weld fastener is configured as a weld stud.

7. A tool for determining an approximate centerline of an installed weld fastener, said tool being usable in conjunction with a dimensional measurement device, the tool comprising:
   a first tool portion having a first cylindrical portion and an externally-threaded shaft formed integrally with said first cylindrical portion, said externally-threaded shaft and said first cylindrical portion having in common a first centerline, wherein said externally-threaded shaft is engageable with mating internal threads of the installed weld fastener when the installed weld fastener is configured as a weld nut;
   a second tool portion having a second centerline, said second tool portion including a second cylindrical portion with an internally-threaded center channel that is engageable with external threads of the installed weld fastener when the installed weld fastener is configured as a weld stud; and a controller in communication with the dimensional measurement device, wherein said controller is configured to calculate the approximate centerline of the installed weld fastener using a set of raw dimensional data provided from the dimensional measurement device;

wherein the dimensional measurement device collects said set of raw dimensional data by measuring, by a plurality of sensors, at least one of a diameter and a centerline of one of said first and second cylindrical portions.

8. The tool of claim 7, wherein said internally-threaded center channel is configured to receive said threaded shaft to thereby facilitate storage of the tool.

9. The tool of claim 7, wherein said first tool portion is constructed of a first material and said second tool portion is constructed of a second material that is sufficiently different from said first material to prevent galling of the tool when said first tool portion is connected to said second tool portion.

10. The tool of claim 7, wherein the dimensional measurement device is selected from the group consisting of: a photogrammetrical device, a digital scanner, and a coordinate measurement machine.

11. A method of determining a dimensional characteristic of an installed weld fastener using a dimensional measurement device, the method comprising:

connecting a threaded portion of a dimensional measurement tool to the installed weld fastener, said tool having a cylindrical portion formed integrally with said threaded portion and having an outer diameter;

measuring a pair of diameters of said cylindrical portion using the dimensional measurement device to thereby determine a set of raw dimensional data, including a centerpoint of the outer diameter;

calculating the characteristic of the installed weld fastener using said set of raw dimensional data, including one of a position of a point of intersection of a centerline intersecting the centerpoint and an offset angle between the centerline and a plane of a work piece in which the weld fastener is installed; and executing a control action when the characteristic of the installed weld fastener is outside of a calibrated range.

12. The method of claim 11, wherein measuring a pair of diameters includes one of: digitally scanning a surface said cylindrical portion, projecting a laser beam onto said surface of said cylindrical portion, and taking a series of photographic images of said surface of said cylindrical portion.

13. The method of claim 11, wherein connecting a threaded portion of said tool includes threading said threaded portion of said tool onto an externally-threaded shaft of a weld stud when the installed weld fastener is configured as said weld stud.

14. The method of claim 11, wherein connecting a threaded portion of said tool to mating threads of the weld fastener includes threading said threaded portion of said tool onto an internally-threaded center channel of a weld nut when the installed weld fastener is configured as said weld nut.

15. The method of claim 11, wherein executing at least one control action is selected from the group consisting of: generating a report, activating an alarm, and transmitting a message to a remote location.

* * * * *